(12) United States Patent
Nore et al.

(10) Patent No.: US 11,231,765 B2
(45) Date of Patent: Jan. 25, 2022

(54) PERIPHERAL POWER DOMAINS

(71) Applicant: Nordic Semiconductor ASA, Trondheim (NO)

(72) Inventors: Anders Nore, Trondheim (NO); Joar Rusten, Trondheim (NO); Ronan Barzic, Trondheim (NO); Vegard Endresen, Trondheim (NO); Per-Carsten Skoglund, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/255,952

(22) PCT Filed: Jun. 26, 2019

(86) PCT No.: PCT/EP2019/066994
§ 371 (c)(1),
(2) Date: Dec. 23, 2020

(87) PCT Pub. No.: WO2020/002423
PCT Pub. Date: Jan. 2, 2020

(65) Prior Publication Data
US 2021/0271307 A1    Sep. 2, 2021

(30) Foreign Application Priority Data
Jun. 28, 2018    (GB) ..................................... 1810663

(51) Int. Cl.
*G06F 1/32*    (2019.01)
*G06F 1/3215*    (2019.01)
(52) U.S. Cl.
CPC ................................. *G06F 1/3215* (2013.01)

(58) Field of Classification Search
CPC ..... G06F 1/32; G06F 1/12; G06F 1/28; G06F 9/44; G06F 21/57
See application file for complete search history.

(56) References Cited

U.S. PATENT DOCUMENTS 5,579,531 A    11/1996 Sugita
5,619,729 A    4/1997 Bland et al.
(Continued)

FOREIGN PATENT DOCUMENTS

JP    H08 106432 A    4/1996
WO    WO 2011/045678 A1    4/2011
(Continued)

OTHER PUBLICATIONS

IPO Search Report under Section 17(5) for GB1810663.3, dated Jan. 22, 2019, 4 pages.
(Continued)

*Primary Examiner* — Keshab R Pandey
(74) *Attorney, Agent, or Firm* — Klarquist Sparkman, LLP

(57) ABSTRACT

An integrated-circuit device comprises first and second peripherals, connected to a processor via a bus system, a peripheral interconnect that is separate from the bus system, wake up logic, a configuration memory and a power controller. In response to a change of state, the first peripheral generates event signals that are output to the peripheral interconnect. The peripheral interconnect provides the event signal to the second peripheral, which initiates tasks in response. The first peripheral, second peripheral and the wake-up logic are in a first, second and third power domain respectively. The power controller provides power to the third power domain whenever the first or second power domain is powered up. The wake-up logic detects an event signal from the first peripheral and, if it determines that the second peripheral is configured to initiate a task in response, (Continued)

it instructs the power controller to power up the second peripheral.

15 Claims, 5 Drawing Sheets

(56) References Cited

U.S. PATENT DOCUMENTS

| | | | |
|---|---|---|---|
| 9,465,771 B2* | 10/2016 | Davis | G06F 1/266 |
| 2004/0025063 A1 | 2/2004 | Riley | |
| 2006/0114930 A1* | 6/2006 | Lucas | G06F 11/006 |
| | | | 370/465 |
| 2008/0294806 A1 | 11/2008 | Swindle et al. | |
| 2008/0320178 A1 | 12/2008 | Shirasaki et al. | |
| 2009/0259777 A1* | 10/2009 | Margerm | G06F 1/12 |
| | | | 710/61 |
| 2013/0073878 A1 | 3/2013 | Jayasimha et al. | |
| 2014/0201406 A1* | 7/2014 | Balakrishnan | G06F 1/26 |
| | | | 710/110 |
| 2014/0304439 A1 | 10/2014 | Elahi et al. | |
| 2015/0095681 A1 | 4/2015 | Jouin et al. | |
| 2015/0193357 A1 | 7/2015 | Venas et al. | |
| 2016/0026703 A1 | 9/2016 | Elahi et al. | |
| 2017/0115712 A1 | 4/2017 | Davis et al. | |
| 2017/0177256 A1 | 6/2017 | Tripathi et al. | |
| 2018/0004278 A1 | 1/2018 | Lim et al. | |
| 2018/0024614 A1 | 1/2018 | Bhadra et al. | |
| 2019/0361486 A1* | 11/2019 | Malik | G06F 30/39 |

FOREIGN PATENT DOCUMENTS

| | | |
|---|---|---|
| WO | WO 2013/088121 A1 | 6/2013 |
| WO | WO 2017/196418 A1 | 11/2017 |

OTHER PUBLICATIONS

International Search Report and Written Opinion for PCT/EP2019/066994, dated Sep. 26, 2019, 16 pages.

Office action for Norwegian Application No. 20180920, dated Jan. 4, 2019, 7 pages.

Silicon Labs, "AN0025: Peripheral Reflex System (PRS)," Rv. 1.08, Dec. 13, 2010, 28 pages.

CoreSight™ Components, Technical Reference Manual, "Embedded Cross Trigger," Chapter 4, Jul. 10, 2009, 54 pages.

* cited by examiner

PERIPHERAL POWER DOMAINS

CROSS REFERENCE TO RELATED APPLICATIONS

This is the U.S. National Stage of International Application No. PCT/EP2019/066994, filed Jun. 26, 2019, which was published in English under PCT Article 21(2), which in turn claims the benefit of Great Britain Application No. 1810663.3, filed Jun. 28, 2018.

BACKGROUND OF THE INVENTION

This invention relates to integrated-circuit devices with peripheral interconnects, and methods of operating the same.

Integrated-circuit devices, such as radio-on-chip devices, typically comprise one or more processors and a number of peripherals, which are connected to the processor by a bus. Examples of peripherals include a timer, a cryptographic encryption engine, a serial interface (UART), and an embedded radio transceiver.

In a simple architecture, a processor communicates directly with each peripheral over the bus. Peripherals communicate only with the processor, and not directly with each other. However, this is inefficient.

The applicant has previously described a peripheral-to-peripheral communication system in WO 2013/088121. This provides a programmable peripheral interconnect (PPI) that can be configured by the processor so that a first peripheral can signal an event to a second peripheral, so as to cause the second peripheral to perform a task in response to the event of the first peripheral. A channel in the PPI can be configured to connect the event output of the first peripheral to the task input of the second peripheral by writing address values associated with the event output and with the task input as an entry in a mapping table.

For example, such a PPI could be programmed to create a channel between an event output of a serial-interface peripheral and a task input of a crypto-processor. The event signal could be used to signal when the peripheral finishes receiving data over the serial interface and writing the data to a predetermined memory address. The task signal could cause the crypto-processor to read the data from the predetermined memory address and input the data to a cipher operation. The PPI channel connects the event to the task so that cipher operation is initiated in response to the serial-interface peripheral signalling that it has finished writing the data to the memory. This signalling can occur without the processor having to be awake when the signalling takes place, thereby resulting in power savings and potentially also in faster and more accurate device timings.

Another example of a peripheral interconnect is provided in U.S. Pat. No. 5,579,531A (Mitsubishi). This discloses a set of signals lines, or event buses, to which peripherals can be connected, using multiplexers, so that signals can be transmitted between the peripherals.

However, the applicant has recognised that known peripheral interconnects can result in significant power wastage.

The present invention seeks to provide a more power efficient approach to peripheral-to-peripheral communication.

SUMMARY OF THE INVENTION

From a first aspect, the invention provides an integrated-circuit device comprising:
a processor;
a first peripheral;
a second peripheral;
a bus system, connecting the processor, the first peripheral and second peripheral;
a peripheral interconnect, separate from the bus system;
wake-up logic;
a configuration memory; and
a power controller,
wherein:
the first peripheral is configured to generate event signals in response to changes of state within the first peripheral;
the first peripheral comprises a first peripheral interface module for outputting the event signals to the peripheral interconnect;
the peripheral interconnect provides a channel for receiving an event signal from the first peripheral and for providing the event signal to the second peripheral;
the second peripheral is configured to receive event signals from the peripheral interconnect;
the second peripheral comprises a configurable second peripheral interface module for initiating tasks on the second peripheral in response to event signals received from the peripheral interconnect, in accordance with second-peripheral configuration settings stored in the configuration memory;
the first peripheral is in a first power domain;
the second peripheral is in a second power domain;
the wake-up logic is in a third power domain;
the power controller is configured to provide power to the third power domain whenever the first power domain or the second power domain is powered up, such that the wake-up logic is powered up whenever the first or second peripheral is powered up; and
the wake-up logic is connected to the peripheral interconnect and is configured to:
    detect an event signal generated by the first peripheral;
    use the second-peripheral configuration settings to determine whether the second peripheral interface module is configured to initiate a task in the second peripheral in response to the detected event signal; and
    instruct the power controller to power up the second peripheral when the second peripheral interface module is configured to initiate a task in the second peripheral in response to the detected event signal.

From a second aspect, the invention provides a method of operating an integrated-circuit device, the integrated-circuit device comprising:
a processor;
a first peripheral;
a second peripheral;
a bus system, connecting the processor, the first peripheral and second peripheral;
a peripheral interconnect, separate from the bus system;
wake-up logic, connected to the peripheral interconnect;
a configuration memory; and
a power controller,
wherein:
the first peripheral comprises a first peripheral interface module for outputting event signals to the peripheral interconnect;
the peripheral interconnect provides a channel for receiving an event signal from the first peripheral and for providing the event signal to the second peripheral;
the second peripheral comprises a configurable second peripheral interface module for initiating tasks on the second peripheral in response to event signals received from the peripheral interconnect, in accordance with second-peripheral configuration settings stored in the configuration memory;

the first peripheral is in a first power domain;

the second peripheral is in a second power domain;

the wake-up logic is in a third power domain; and the power controller is configured to provide power to the third power domain whenever the first power domain or the second power domain is powered up, such that the wake-up logic is powered up whenever the first or second peripheral is powered up, wherein the method comprises:

the first peripheral generating an event signal in response to a change of state within the first peripheral;

the first peripheral outputting the event signal to the peripheral interconnect;

the wake-up logic detecting the event signal generated by the first peripheral;

the wake-up logic using the second-peripheral configuration settings to determine that the second peripheral interface module is configured to initiate a task in the second peripheral in response to the event signal;

the wake-up logic instructing the power controller to power up the second peripheral, in response to determining that the second peripheral interface module is configured to initiate a task in the second peripheral in response to the event signal;

the second peripheral receiving the event signal from the peripheral interconnect; and the second peripheral initiating the task on the second peripheral in response to the event signal received from the peripheral interconnect.

It will be seen by those skilled in the art that, in accordance with the invention, wake-up logic is provided that enables the peripheral interconnect to support event signalling between peripherals that are in different power domains. This allows a peripheral to be powered down without losing the ability to receive event signals from a peripheral in another power domain. This can result in significant power savings.

The peripherals are not limited to any particular type, and may include such peripherals as: a timer, a UART, a voltage comparator, an encryption engine, an analogue-to-digital converter (ADC), a digital-to-analogue converter (DAC), a radio transmitter, and/or a radio receiver.

A change of state in the first peripheral, which triggers an event signal, may occur in response to an internal event, such as completing an operation, or in response to an external event, such as receiving data from outside the device over a serial connection.

The tasks may be any function or operation which can be performed by the second peripheral, such as transmitting data from the device over an interface.

The first peripheral may also be configured to receive event signals from the peripheral interconnect. The second peripheral may also be configure to output event signals to the peripheral interconnect. The device may comprise further peripherals in addition to the first and second peripherals. The peripheral interconnect may additionally be connected to the further peripherals. The peripheral interconnect may provide any number of channels for signalling events between the peripherals—e.g., 1, 8, 16, 32 or more channels. Each channel may comprise a respective line, or set of lines, to which the peripherals may be connected. Each event signal may be an electrical pulse or a logic state.

The peripheral interface module of each peripheral may interact with the rest of the peripheral through an internal interface within the peripheral. Each peripheral may comprise one or more event interfaces within the peripheral and/or one or more task interfaces within the peripheral. Each event interface may relate to a respective event type, and may be connectable to any of the one or more channels by an event-publishing peripheral interface module of the peripheral. Each task interface may relate to a respective task type, and may be connectable to any of the channels by a task-subscribing peripheral interface module of the peripheral. Each peripheral having an event interface may comprise a demultiplexer for connecting the event interface to a selectable channel of the channels. In this way, event signals from the event output can be published on the selected channel. The selection of the channel may be controlled through a register interface of the peripheral—e.g., by writing a channel identifier into a publish register for the event interface. Each peripheral having a task interface may comprise a multiplexer for connecting a selectable channel of the channels to the task interface. In this way, the task interface of the peripheral can be subscribed to receive event signals from the selected channel. The selection of this channel may be controlled through a register interface of the peripheral—e.g., by writing a channel identifier into a subscription register for the task interface.

In some embodiments, a channel may receive events from one or more peripherals, and a channel may output events to one or more peripherals—i.e., multiple peripherals may publish to and/or be subscribed to the same channel.

An event signal from one peripheral may be communicated to another peripheral over the peripheral interconnect and may trigger a task in the other peripheral. This can provide substantial power savings by allowing the processor to remain in a sleep state while peripherals communicate directly with each other. It can also enable quicker communication between peripherals.

Further power savings may be achieved by placing one or more peripherals in respective independent power domains. The wake-up logic is preferably in a higher power domain than any of the peripherals that are connected to the peripheral interconnect.

The wake-up logic may be connected to each channel of the peripheral interconnect. It may monitor each channel for events. In other embodiments, the wake-up logic may be connected to one or more peripheral interface modules; it may receive a signal from an event-publishing peripheral interface module before or as an event is signalled to a channel by the peripheral interface module.

The wake-up logic may be configured to read the second-peripheral configuration settings (e.g., the subscription registers of the second peripheral) to determine whether any task of the second peripheral is subscribed to the channel on which the event signal is detected. If so, then the wake-up logic may instruct the power controller to power up the second peripheral. It will be appreciated that, if the second peripheral is already powered up, no action is required; in this case, the power controller may simply ignore the power-up instruction. Alternatively, the wake-up logic may be configured to detect that the second peripheral is already powered up, and omit instructing the power controller to wake the second peripheral in this situation.

More generally, on detecting an event signal on a channel of the peripheral interconnect, the wake-up logic may be configured to use the configuration settings of a plurality of peripherals (e.g., of every peripheral that is able to receive signals over the peripheral interconnect) to determine whether any of the plurality of peripherals is configured to initiate a task in response to the event signal. In some embodiments, the configuration settings comprise respective subscription registers of the plurality of peripherals. The wake-up logic may be configured to instruct the power controller to power up the identified peripheral or peripherals. This may comprise instructing the power controller to power up one or more power domains that contain the identified peripheral or peripherals.

The wake-up logic may be configured to latch an event signal on a channel of the peripheral interconnect (e.g., to maintain a high logic static). It may latch the event signal until every peripheral that is subscribed to the event is powered on.

In some embodiments, the first peripheral may be able to signal a plurality of different event types. The first peripheral interface module may comprise a corresponding plurality of demultiplexers for enabling each event type to be published on a selected one of the channels. The first peripheral interface module may further comprise a plurality of logic OR gates, connected to the outputs of the demultiplexers, so as to allow two or more event types to be published to a common channel.

In some embodiments, the second peripheral may be able to initiate a plurality of different task types. The second peripheral interface module may comprise a plurality of multiplexers—e.g., one for each task type—for enabling each task type to be subscribed to any one of the channels.

In this way, by configuring the multiplexers of the second peripheral interface module, the device can select which channels of the peripheral interconnect trigger tasks on the second peripheral. When one or more tasks of the second peripheral are set to be initiated by event signals on a particular channel, the second peripheral is said to be "subscribed" to this channel.

By allowing one or more events to be published on one or more channels, and by allowing one or more tasks to be subscribed to one or more channels, it is possible to set up "one-to-one", "many-to-one", "one-to-many" and "many-to-many" relationships between events and tasks.

Each peripheral that can publish events onto the peripheral interconnect may comprise a respective event-publishing peripheral interface module, having any of the features of the first peripheral interface module disclosed herein. Each peripheral that can initiate tasks from events signalled over the peripheral interconnect may comprise a respective task-subscribing peripheral interface module, having any of the features of the second peripheral interface module disclosed herein. Some peripherals may comprise event-publishing and task-subscribing peripheral interface modules. By distributing the logic that determines the routing of an event signal to the peripherals in this way, some of the complexity of a single, central routing mechanism, as disclosed in the applicant's earlier application WO 2013/088121, can be avoided. In particular, it can allow peripherals to be added or removed from the design much more straightforwardly.

Each event-publishing peripheral interface module may provide a register interface comprising one or more publish registers. Each publish register may be associated with a respective event type. The contents of each publish register (e.g., a channel identifier) may determine a channel that a respective event type is signalled over. In particular, the value in each publish register may control a respective demultiplexer (or multiplexer) in the event-publishing peripheral interface module. Each publish register may have its own address which can then be written to by software executing on the processor. This makes it easy for software to cause an event signal to be published onto a desired channel of the peripheral interconnect. In some embodiments, the register interface further comprises one or more event-enable registers, for enabling and disabling the signalling of a respective event type. This allows for a quick and efficient way of disabling and enabling the publishing of a particular event to a channel, without having to delete and rewrite the publish-register values each time.

Each task-subscribing peripheral interface module may provide a register interface comprising one or more subscribe registers. Each subscribe register may be associated with a respective task type. The contents of each subscribe register (e.g., a channel identifier) may determine a channel that a respective task type is subscribed to. In particular, the value in each subscribe register may control a respective multiplexer (or demultiplexer) in the task-subscribing peripheral interface module. Each subscribe register may have its own address which can then be written to by software executing on the processor. This makes it easy for software to cause task to be initiated in response to signals on a desired channel of the peripheral interconnect. In some embodiments, the register interface further comprises one or more task-enable registers, for enabling and disabling the initiating of a respective task type. This allows for a quick and efficient way of disabling and enabling the subscription of a particular task to a channel, without having to delete and rewrite the subscribe-register values each time.

The publish registers and the subscribe registers may be populated with appropriate channel indexes by software executing on the device.

The peripheral interconnect may comprise an interconnect controller, which may provide a register interface for controlling the peripheral interconnect. It may provide an interface for enabling and disabling each channel, preferably individually. It may provide an interface for grouping two or more channels into a group. It may provide an interface for enabling and/or disabling a group of channels with a single data write (e.g., depending on the value of a single bit in a bit-field). This can provide a fast way of setting up or dismantling channels, and reduce computational power usage.

In some embodiments, the interconnect controller is configured so that, when the interconnect controller is instructed to enable a first group of channels and is instructed to disable a second group of channels, and there is a common channel that is in the first group and the second group, then the common channel is enabled by the interconnect controller.

This feature is useful when there is a contradiction in enabling or disabling groups of channels. For example, if a first group of channels is enabled and a second group of channels is disabled, and the first and second groups have common channels, then effectively there is a contradiction in that the common channels are required to be both enabled and disabled. In this situation, according to these embodiments, the common channels are enabled. This enables the common channels still to receive and transmit event signals, despite the disabling instruction.

In some embodiments, one or both of the first peripheral and second peripherals may comprise a direct-memory-access (DMA) controller. In this way, the first and second peripherals may be able to exchange data over the bus system while the processor is in a low-power sleep state, in addition to be able to signal events over the peripheral interconnect. This can allow for complex peripheral-to-peripheral interactions at very low power.

In some embodiments, the integrated-circuit device further comprises a further peripheral interconnect which is in a different clock domain from the first peripheral interconnect. The first peripheral interconnect and the further peripheral interconnect may be coupled so that an event signal generated by a peripheral connected to the first peripheral interconnect can initiate a task on a peripheral connected to the further peripheral interconnect. This allows peripherals that are in different clock domains, and in different power domains, to communicate with each other.

The wake-up logic may be a hardware wake-up module; it is preferably distinct from the processor. It may comprise a plurality of logic gates.

The integrated-circuit device may be a system-on-chip, multiprocessor system-on-chip, radio-on-chip device, or any other form of integrated circuit.

Any preferred or optional feature of one aspect of embodiment described herein may, wherever appropriate, be used in any other aspect or embodiment. Embodiments may contain preferred or optional features in any appropriate combinations.

BRIEF DESCRIPTION OF THE DRAWINGS

Certain embodiments of the invention will now be described, by way of example only, with reference to the accompanying drawings in which.

DETAILED DESCRIPTION

Figure 1:
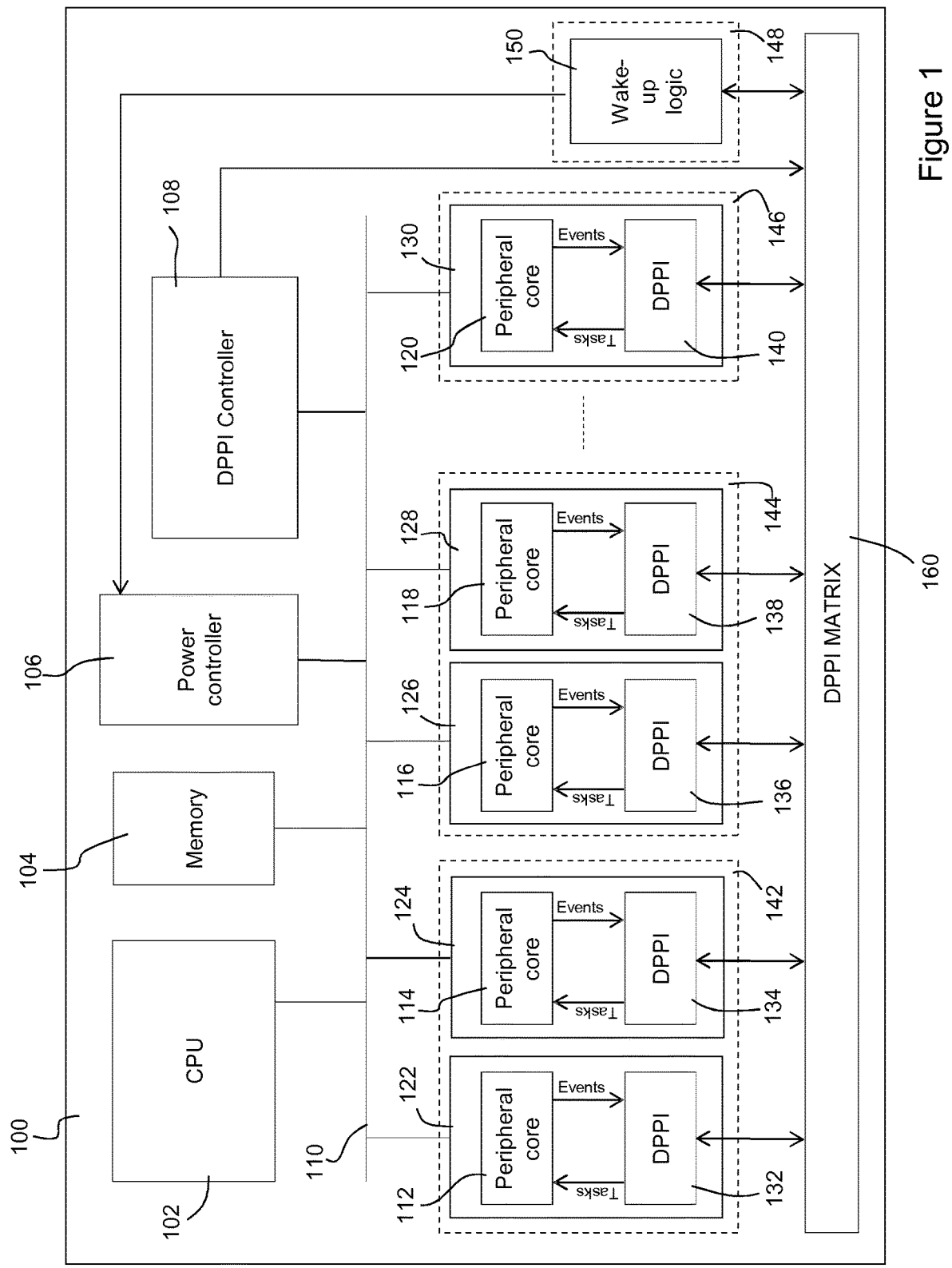
FIG. 1 is a schematic drawing of an integrated-circuit device in accordance with an embodiment of the present invention.

FIG. 1 is a schematic diagram of an integrated-circuit system-on-chip device 100 in accordance with an embodiment of the present invention. The device 100 includes a processor 102, a memory 104 (which may include a volatile region, such as SRAM, and/or a non-volatile region, such as flash, and any appropriate memory controllers), and a set of peripherals 122-130, all of which are connected to a bus system 110. The processor 102 could be an Arm' Cortex-M' series processor. The bus system could be an Arm™ AMBA bus system; it may include one or more Advanced High-Performance Buses (AHB) and one or more Advanced Peripheral Buses (APB).

Also connected to the bus system 110 is a power controller 106 capable of powering up or powering down the peripherals 122-130. The power controller 106 is connected to wake-up logic 150 that provides instructions to the power controller 106 to power up a particular peripheral 122-130 when needed.

The peripherals 122-130 are further connected to each other via a DPPI matrix 160, which comprises a set of physical channels connecting the peripherals together directly, separately from the bus system 110. The DPPI matrix 160 supports peripheral-to-peripheral communication that does not have to travel via the processor 102 over the bus system 110. This allows one peripheral to signal another while the processor 102 is in a low power (sleep) state, thereby allowing the device 100 to save power by powering down the processor 102 while peripherals 122-130 are still operating. A Distributed Programmable Peripheral Interconnect (DPPI) controller 108 allows the processor 102 to configure communication channels between the peripherals 122-130, which the peripherals can then use without further involvement from the processor 102.

The DPPI controller 108 is connected to the bus system 110. The DPPI controller 108 and the wake-up logic 150 are also connected to the DPPI matrix 160.

Examples of peripherals that may be included in the present device 100 as peripherals 122-130, or as further peripherals (not shown), include timers, digital to analogue converters, Universal Asynchronous Receiver-Transmitters (UARTs), hardware encryption engines, radios, and voltage comparators. Other peripherals that are typically used in integrated-circuit devices may also be included.

Each peripheral 122-130 in FIG. 1 has a peripheral core 112-120 and a DPPI module 132-140. Each DPPI module 132-140 receives "events" from the peripheral core 112-120 and outputs corresponding "event" signals onto the DPPI matrix 160. It also receives "task" signals from the DPPI matrix 160 and triggers corresponding "tasks" in the peripheral core 112-120. Event signals are used to notify other peripherals about events that have happened within the event generating peripheral (e.g., for an encryption engine to signal that it has completed an encryption operation). Tasks signals are used to trigger actions in peripherals (e.g., to trigger a serial-port peripheral to start outputting data, stored at a predetermined address in the memory 104, over a serial interface).

An event signal from one peripheral 122-130 can be connected to a task signal of another peripheral 122-130 by the processor 102 connecting the DPPI modules 132-140 of the two peripherals via the DPPI matrix 160. This is done through setting publish/subscribe registers in each peripheral 122-130. The DPPI matrix 160 provides a number of "channels", each of which can be used to couple one or more events to one or more tasks. An event generated by a peripheral 122-130 can be published onto a DPPI channel by writing a channel identifier to a "PUBLISH" register for that peripheral. Similarly a task receivable by a peripheral can be subscribed to a DPPI channel by writing a channel identifier to a "SUBSCRIBE" register for that peripheral. These "SUBSCRIBE" registers provide a configuration memory, storing configuration settings for the peripheral, as disclosed above.

For example, a timer peripheral may generate an event signal upon the completion of a timing routine. If the "PUBLISH" register in the timer peripheral for this event contains a channel index value, then the event is published onto the DPPI channel having this channel index. This DPPI channel is accessible to any peripheral that subscribes to it. For example, an ADC peripheral may subscribe to the same channel onto which the timer peripheral published the event signal corresponding to the completion of the timing routine. This may be done by writing the same channel index value to an appropriate "SUBSCRIBE" register of the ADC peripheral to subscribe to this channel. When the timer peripheral finishes its timing routing, its DPPI module signals the event onto the DPPI channel in the matrix 160; this signal is received by the DPPI module of the ADC peripheral and is then provided to the core of the ADC peripheral, so that, for example, the ADC begins conversion of an analog signal to a digital signal.

Thus, the logic for publishing an event onto a channel, and for subscribing a task to a channel, is located within the peripherals 122-130 themselves, as the DPPI modules. That is, the event publishing and task subscribing logic is distributed across the peripherals 122-130, by situating respective "Distributed PPI" logic modules 132-140 within each peripheral. The logic for handling each task or event may be similar or identical across the various peripherals 122-130.

Each peripheral 122-130 includes one subscribe register per task and one publish register per event. Every publish register has a channel index field that determines the channel the event is published to. Similarly, every subscribe register has a channel index field that determines the channel the tasks is subscribing to. In addition there is a enable bit for each subscribe and publish register that needs to be enabled before the subscription or publishing takes effect.

One event can trigger multiple tasks by subscribing different tasks to the same channel. Similarly, one task could be triggered by multiple events by publishing different events to the same channel. For advanced use-cases multiple events and multiple tasks could be connected to the same channel forming a many-to-many connection. If multiple events are published on the same channel at the same time, the events will be merged and only one event is routed through the DPPI system.

The DPPI controller 108 provides a register interface for the processor 102 to enable and disable channels. It also allows channels to be collected into groups, and provides an interface for enabling and disabling a group of channels with a single register write. For example, the processor 102 may connect a timer event to an ADC task by:
- writing the index for an available channel (e.g., "channel_3") to the PUBLISH register for the timer event in the DPPI module of the timer peripheral;
- writing the same channel index (e.g., "channel_3") to the SUBSCRIBE register for the conversion task in the DPPI module of the ADC peripheral; and
- writing an enable flag for this channel (e.g., "channel_3") to the CHANNEL_ENABLE register of the DPPI controller 108.

In this way, a timing task completion event generated by the timer peripheral will cause a task to be triggered at the ADC peripheral.

The PUBLISH and SUBSCRIBE registers of the peripherals, and the registers of the DPPI controller 108, all share a memory addressing space with the memory 104 so that they can be accessed, by memory-mapped I/O, by the processor 102.

Thus, a DPPI matrix 160 allows an event signal from one peripheral to trigger a task in another peripheral, without needing to involve the processor 102 directly. This can provide substantial power savings by allowing the processor 102 to remain in a sleep state while peripherals communicate directly with each other. Further, by locating the event publishing and task subscribing logic within the peripherals themselves, greater flexibility is achieved as events and tasks may be mapped on a one-to-one, many-to-one, one-to-many and a many-to-many basis, which cannot straightforwardly be achieved if the event publishing and task subscribing logic were implemented centrally.

In the present embodiment, it is possible for groups of peripherals 122-130 to be powered up or powered down independently of each other. This results in further power savings by letting individual peripherals or groups of peripherals sleep until an event is published onto a channel that the peripheral(s) subscribe to.

In the embodiment of FIG. 1, peripherals 122 and 124 are located within a first power domain. The first power domain is marked with a dashed line 142. Peripherals 126 and 128 are located within a second power domain 144 and peripheral 130 is located within a third power domain 146. Wake-up logic 150, which is connected to the peripherals 122-130 via the DPPI matrix 160, is in a different, higher-level power domain 148.

The wake-up logic has access to the SUBSCRIBE registers of each peripheral. By monitoring the traffic on the DPPI matrix 160, the wake-up logic 150 is capable of detecting when an event has been published onto a channel to which a particular sleeping peripheral subscribes. Upon detecting this event, the wake-up logic 150 sends a signal to the power controller 106 to power-up this peripheral. The power controller 106 subsequently wakes up the sleeping peripheral. The power controller 106 reports back to the wake-up logic 150 once the peripheral is powered up. The wake-up logic 150 latches the event signal on the channel of the DPPI matrix 160 until every peripheral that is subscribed to the event is awake and has had time to receive the event. The wake-up logic is in a higher-level power domain that is powered on whenever any of the peripherals 122-130 is powered on.

Figure 2:
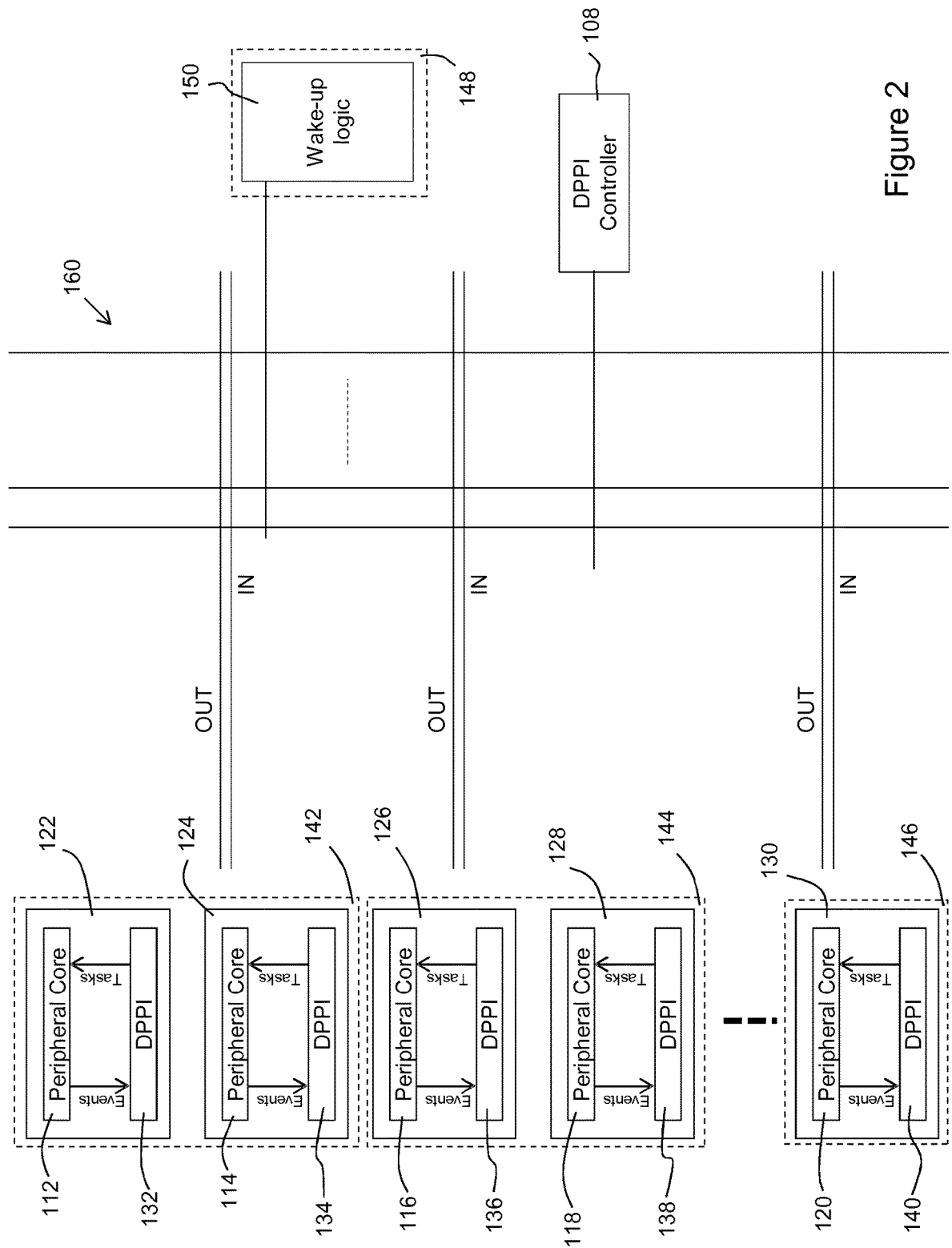
FIG. 2 is a schematic drawing of a peripheral interconnect system in accordance with an embodiment of the present invention.

FIG. 2 shows the peripherals 122-130 in connection with the channels of the DPPI matrix 160. The DPPI module 132-140 in each peripheral 122-130 is capable of publishing events on to one or more DPPI channels, and is also capable of subscribing to channels. Thus, an event generated in one peripheral can cause tasks to be triggered in one or more other peripherals.

Figure 3:
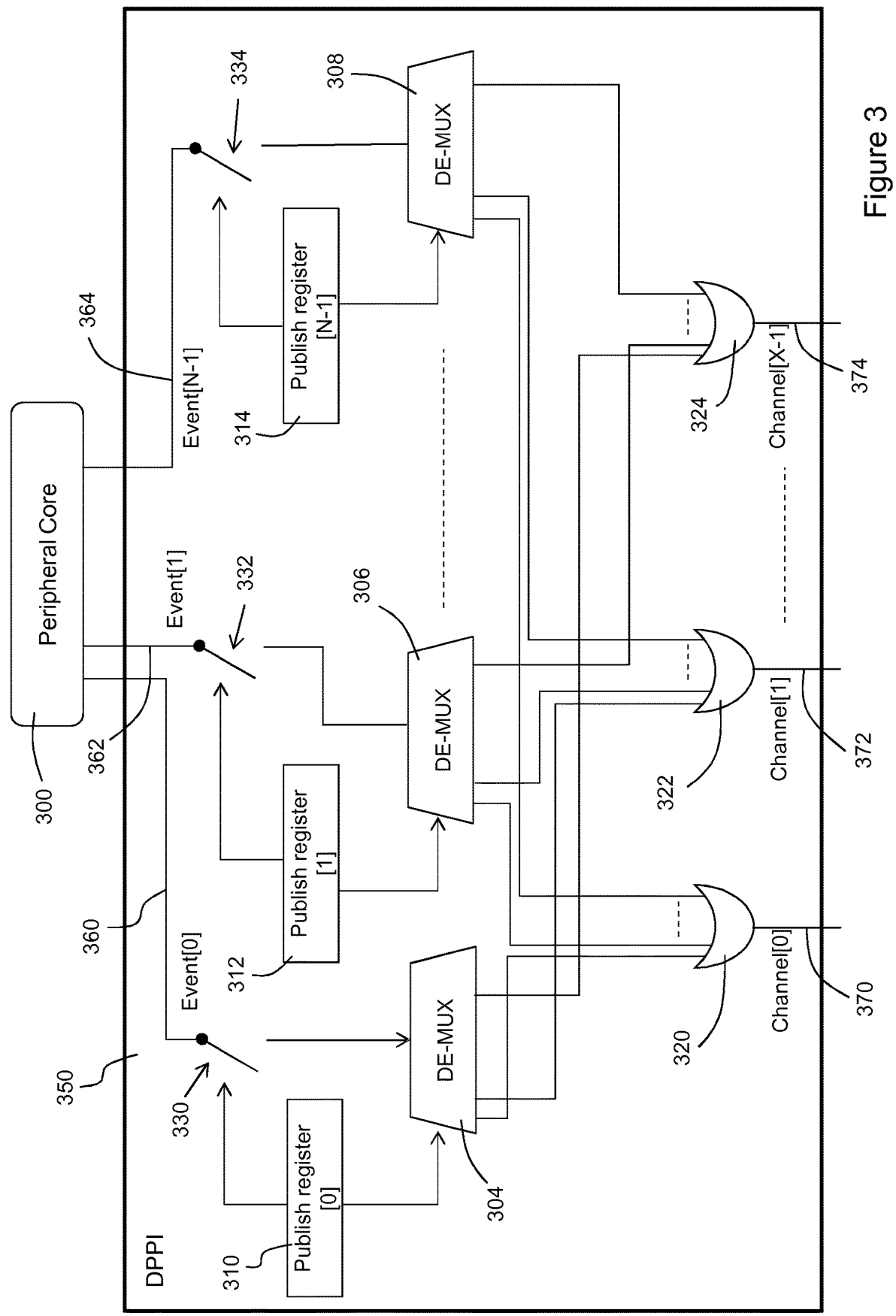
FIG. 3 is a schematic drawing of the event generating part of a peripheral in accordance with an embodiment of the present invention.

FIG. 3 illustrates the event-generating part of a peripheral 122-130, in accordance with an embodiment of the present invention. The number of events, N, may vary between the peripherals 122-130, but the same circuit design shown here is employed in each of the peripheral DPPI modules 132-140.

The peripheral core 300 of a peripheral 122-130 generates event signals 360-364. For example, a timer peripheral may generate an event signal once a timing task is complete. The peripheral may generate one or a plurality of different types of event signal. The event signals are then published onto channels 370-374 by means of the peripheral's DPPI module 350 which includes configurable logic comprising switches 330-334, a set of registers 310-314, de-multiplexers 304-308 and OR gates 320-324.

Each switch 330, 332, 334 is arranged to receive a different respective type of event signal on a respective event line 360, 362, 364 from the peripheral core 330. A respective PUBLISH register 310, 312, 314 includes an "enable" bit that determines whether to close the respective switch 330, 332, 334, or to open it. In this way, the processor 102 can quickly enable or disable the publishing of a particular type of event signal.

If the switch 330-334 is closed, the event line 360, 362, 364 is connected to a respective de-multiplexer 304, 306, 308. The de-multiplexer 304 has as many outputs as there are channels in the DPPI matrix 160. The respective PUBLISH register 310-314 includes a channel index field whose value determines which one of the outputs of the de-multiplexer 304 is connected to the incoming event line 360-364. The remaining outputs of the de-multiplexer 304 are set to null.

There are as many de-multiplexers 304-308 as there are event lines from the peripheral core 300. Each de-multiplexer 304-308 produces a plurality of outputs, each output corresponding to a respective channel.

For each channel, the outputs of the de-multiplexers 304-308 corresponding to that channel are fed to a respective output logical OR gate 320, 322, 324, which performs a logical OR operation on the outputs. The outputs of the logical OR gates 320-324 are connected to respective lines 370, 372, 374 of the DPPI matrix 160 that correspond to respective channels.

Thus, if two or more events are set to be published onto the same channel by one peripheral 122-130, all the events are output to the channel because of the OR gate 320-324.

Figure 4:
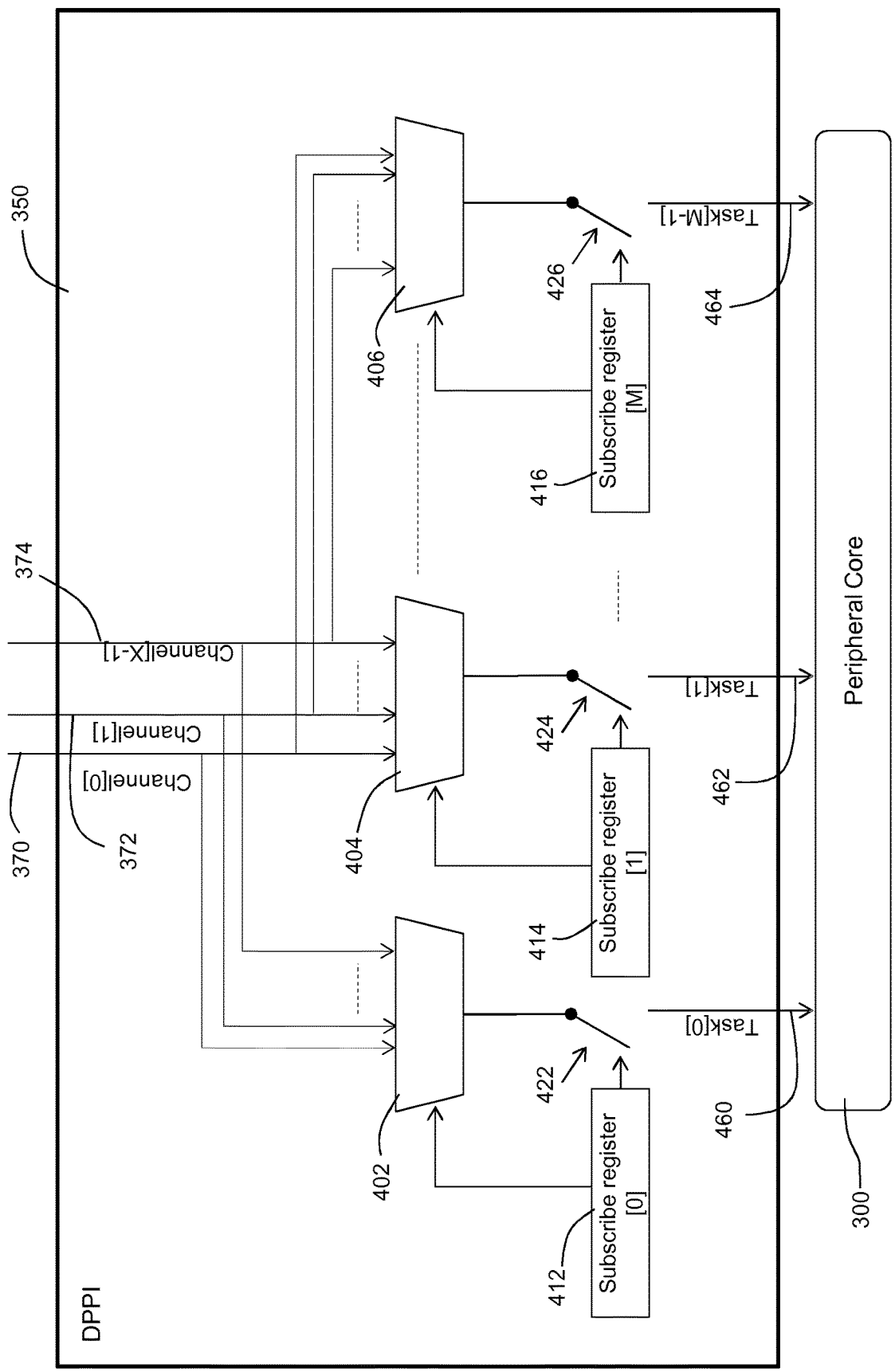
FIG. 4 is a schematic drawing of the task receiving part of a peripheral in accordance with an embodiment of the present invention.

FIG. 4 illustrates the task-receiving part of a peripheral 122-130, in accordance with an embodiment of the present invention.

The peripheral core 300 has inputs 460-464 for receiving task signals, each task input being associated with a particular type of task that the peripheral core 300 may perform. For example, in an ADC peripheral, one task may be to convert an analog signal to a digital signal. A particular task may be subscribed to a particular DPPI channel, such that if a signal corresponding to an event from another peripheral is transmitted over that channel, a corresponding task is triggered at the receiving peripheral. The peripheral connects to different channels by means of multiplexers 402-406 and registers 412-416.

All of the incoming channel signals, from every channel in the DPPI matrix 160, are split and fed to each multiplexer 402-406. Each multiplexer 402-406 is controlled by the contents of a respective SUBSCRIBE register 412-416. Each multiplexer has just one output which corresponds to a respective task in the peripheral core 300. The output of each multiplexer 402-406 is a selection of one of the DPPI channel inputs. Which channel is selected depends on the contents of the SUBSCRIBE register 412-416. In this way, each SUBSCRIBE register determines the output of its respective multiplexer, and thus determines which channel the task associated with that multiplexer is subscribed to.

Before reaching the core 300, the output of each multiplexer is fed to a respective switch 422-426. The switches are controlled by an enable flag in the contents of the SUBSCRIBE register. This allows each task signal to be straightforwardly enabled or disabled, as required. Task signals that pass through these switches are then fed to the peripheral core 300, where the appropriate task is then carried out.

Figure 5:
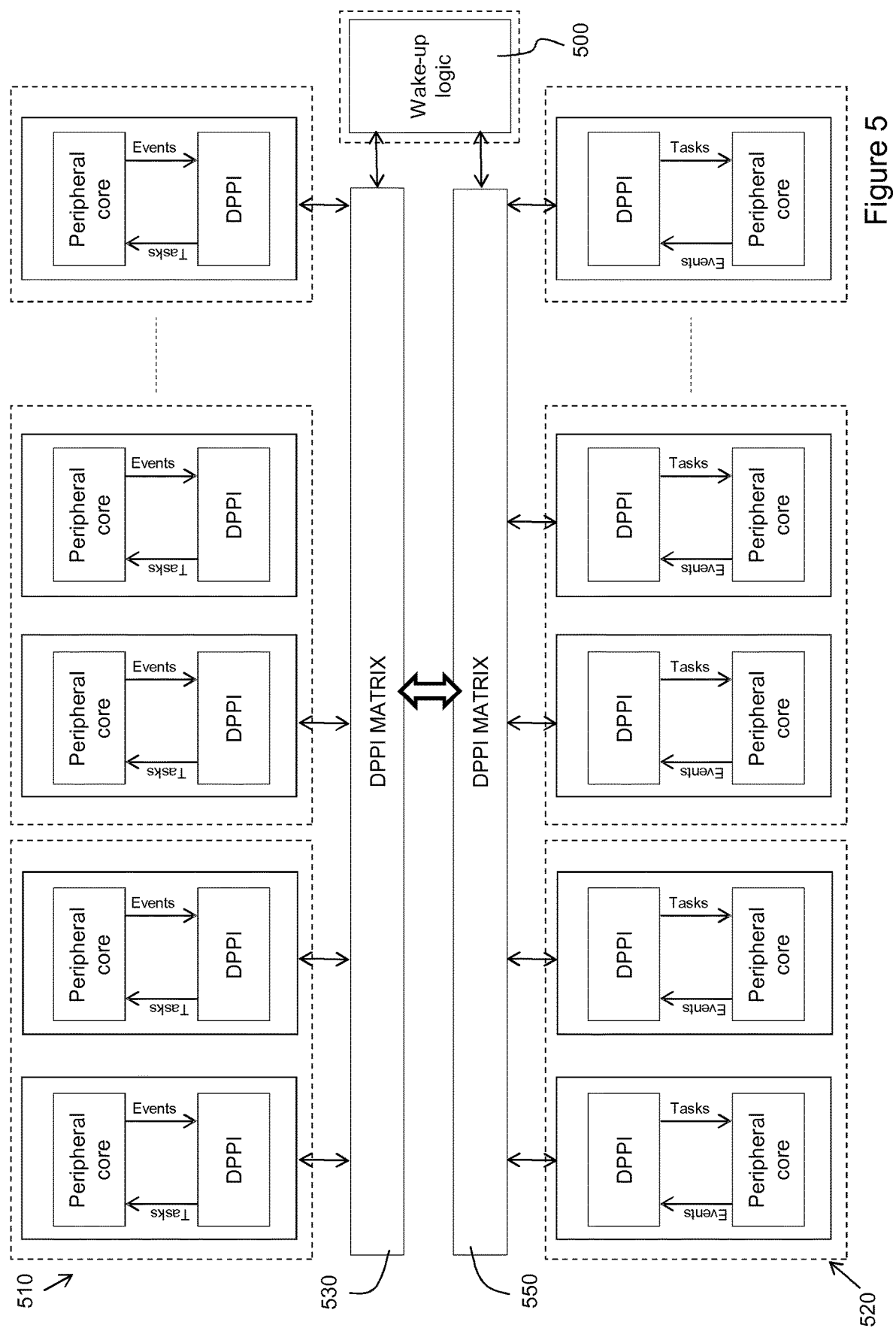
FIG. 5 is a schematic drawing showing peripherals in two different clock domains in accordance with some embodiments of the present invention.

FIG. 5 illustrates a variant system-on-chip device having two sets of peripherals 510, 520, each set communicating with a respective DPPI matrix 530, 550. In this example, the first set of peripherals 510 and the associated first DPPI matrix 530 are located within a first clock domain (for example, a clock running at 16 MHz) whilst the second set of peripherals 520 and the associated second DPPI matrix 550 are located within a second clock domain (for example, a clock running at 32 MHz).

The DPPI matrices 530 and 550 are bridged by logic enabling the first set of peripherals 510 to communicate with the second set of peripherals 520.

A single wake-up logic module 500 is connected to both bus matrices 530 and 550. The wake-up logic 500 has access to the SUBSCRIBE registers within each peripheral. The wake-up logic 500 monitors the two DPPI matrices 530, 550 for a signal on a channel to which one or more peripherals are subscribed. If such a signal is detected, and the wake-up logic 500 determines that a subscribing peripheral is powered down, the wake-up logic 500 sends a signal to the power controller 106 to wake up the peripheral. This peripheral can then receive the signal from the channel, which may then trigger a task.

By situating the wake-up logic 500 in a different, higher-level power domain to that of the peripherals, the wake-up logic can power-up the peripherals independently of the power on status of the peripherals.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
   a processor;
   a first peripheral;
   a second peripheral;
   a bus system, connecting the processor, the first peripheral and second peripheral;
   a peripheral interconnect, separate from the bus system;
   wake-up logic;
   a configuration memory; and
   a power controller,
   wherein:
   the first peripheral is configured to generate event signals in response to changes of state within the first peripheral;
   the first peripheral comprises a first peripheral interface module for outputting the event signals to the peripheral interconnect;
   the peripheral interconnect provides a channel for receiving an event signal from the first peripheral and for providing the event signal to the second peripheral;
   the second peripheral is configured to receive event signals from the peripheral interconnect;
   the second peripheral comprises a configurable second peripheral interface module for initiating tasks on the second peripheral in response to event signals received from the peripheral interconnect, in accordance with second-peripheral configuration settings stored in the configuration memory;
   the first peripheral is in a first power domain;
   the second peripheral is in a second power domain;
   the wake-up logic is in a third power domain;
   the power controller is configured to provide power to the third power domain whenever the first power domain or the second power domain is powered up, such that the wake-up logic is powered up whenever the first or second peripheral is powered up; and
   the wake-up logic is connected to the peripheral interconnect and is configured to:
     detect an event signal generated by the first peripheral;
     use the second-peripheral configuration settings to determine whether the second peripheral interface module is configured to initiate a task in the second peripheral in response to the detected event signal; and
     instruct the power controller to power up the second peripheral when the second peripheral interface module is configured to initiate a task in the second peripheral in response to the detected event signal.

2. The integrated-circuit device of claim 1, wherein the peripheral interconnect provides a plurality of channels.

3. The integrated-circuit device of claim 1, wherein each channel comprises a respective line to which peripherals may be connected.

4. The integrated-circuit device of claim 1, wherein the first peripheral comprises an event interface within the peripheral, wherein the event interface is connectable to any channel of the peripheral interconnect.

5. The integrated-circuit device of claim 4, wherein the first peripheral comprises a demultiplexer for connecting the event interface to a selectable channel of the peripheral interconnect.

6. The integrated-circuit device of claim 4, wherein the first peripheral provides a register interface comprising a publish register for selecting a channel of the peripheral interconnect to which the event interface is connected.

7. The integrated-circuit device of claim 1, wherein the second peripheral comprises a task interface within the peripheral, wherein the task interface is connectable to any channel of the peripheral interconnect.

8. The integrated-circuit device of claim 7, wherein the second peripheral comprises a multiplexer for connecting a selectable channel of the peripheral interconnect to the task interface.

9. The integrated-circuit device of claim 7, wherein the second peripheral provides a register interface comprising a subscribe register for selecting a channel of the peripheral interconnect to connect to the task interface.

10. The integrated-circuit device of claim 1, comprising a plurality of peripherals configured to receive event signals from the peripheral interconnect, wherein the wake-up logic is configured:
   to detect an event signal on a channel of the peripheral interconnect;
   to use the configuration settings of the plurality of peripherals to determine whether any of the plurality of peripherals is configured to initiate a task in response to the detected event signal; and
   when one or more identified peripherals of the plurality of peripherals is configured to initiate a task in response to the detected event signal, to instruct the power controller to power up the identified peripheral or peripherals.

11. The integrated-circuit device of claim 1, wherein the wake-up logic is configured to latch an event signal on a channel of the peripheral interconnect until every peripheral that is subscribed to the event is powered on.

12. The integrated-circuit device of claim 1, wherein the peripheral interconnect comprises an interconnect controller that provides a register interface for enabling and disabling each channel of the peripheral interconnect.

13. The integrated-circuit device of claim 1, wherein the peripheral interconnect comprises an interconnect controller that provides a register interface for grouping two or more channels into a group, and for enabling and disabling a group of channels with a single data write.

14. The integrated-circuit device of claim 1, comprising a further peripheral interconnect which is in a different clock domain from the first peripheral interconnect, wherein the first peripheral interconnect and the further peripheral interconnect are coupled so that an event signal generated by a peripheral connected to the first peripheral interconnect can initiate a task on a peripheral connected to the further peripheral interconnect.

15. A method of operating an integrated-circuit device, the integrated-circuit device comprising:
   a processor;
   a first peripheral;
   a second peripheral;
   a bus system, connecting the processor, the first peripheral and second peripheral;
   a peripheral interconnect, separate from the bus system;
   wake-up logic, connected to the peripheral interconnect;
   a configuration memory; and
   a power controller,
   wherein:
   the first peripheral comprises a first peripheral interface module for outputting event signals to the peripheral interconnect;
   the peripheral interconnect provides a channel for receiving an event signal from the first peripheral and for providing the event signal to the second peripheral;
   the second peripheral comprises a configurable second peripheral interface module for initiating tasks on the second peripheral in response to event signals received from the peripheral interconnect, in accordance with second-peripheral configuration settings stored in the configuration memory;
   the first peripheral is in a first power domain;
   the second peripheral is in a second power domain;
   the wake-up logic is in a third power domain; and
   the power controller is configured to provide power to the third power domain whenever the first power domain or the second power domain is powered up, such that the wake-up logic is powered up whenever the first or second peripheral is powered up,
   wherein the method comprises:
   the first peripheral generating an event signal in response to a change of state within the first peripheral;
   the first peripheral outputting the event signal to the peripheral interconnect;
   the wake-up logic detecting the event signal generated by the first peripheral;
   the wake-up logic using the second-peripheral configuration settings to determine that the second peripheral interface module is configured to initiate a task in the second peripheral in response to the event signal;
   the wake-up logic instructing the power controller to power up the second peripheral, in response to determining that the second peripheral interface module is configured to initiate a task in the second peripheral in response to the event signal;
   the second peripheral receiving the event signal from the peripheral interconnect; and
   the second peripheral initiating the task on the second peripheral in response to the event signal received from the peripheral interconnect.

* * * * *